(12) United States Patent
Sun et al.

(10) Patent No.: US 8,030,814 B2
(45) Date of Patent: Oct. 4, 2011

(54) DEVICE TO RELIEVE THRUST LOAD IN A ROTOR-BEARING SYSTEM USING PERMANENT MAGNETS

(75) Inventors: Lin Xiang Sun, Kirkland (CA); Huai Lu Lin, Kirkland (CA)

(73) Assignee: Danfoss Turbocor Compressors B.V. (NL)

( * ) Notice: Subject to any disclaimer, the term of this patent is extended or adjusted under 35 U.S.C. 154(b) by 0 days.

(21) Appl. No.: 12/883,668

(22) Filed: Sep. 16, 2010

(65) Prior Publication Data

US 2011/0002566 A1    Jan. 6, 2011

Related U.S. Application Data

(63) Continuation of application No. 10/520,798, filed as application No. PCT/CA03/000926 on Jun. 18, 2003, now Pat. No. 7,800,268.

(60) Provisional application No. 60/394,528, filed on Jul. 10, 2002.

(51) Int. Cl.
*H02K 7/09* (2006.01)
*F16C 32/04* (2006.01)

(52) U.S. Cl. .................................. 310/90.5; 310/68 B

(58) Field of Classification Search .................. 310/90.5, 310/68 B
See application file for complete search history.

(56) References Cited

U.S. PATENT DOCUMENTS

| | | | |
|---|---|---|---|
| 2,782,354 A | 2/1957 | Thomas | |
| 3,845,997 A | 11/1974 | Boden et al. | |
| 4,167,295 A | 9/1979 | Glaser | |
| 4,370,004 A | 1/1983 | Morikawa et al. | |
| 5,291,975 A | 3/1994 | Johnson et al. | |
| 5,360,470 A | 11/1994 | Ono et al. | |
| 5,522,694 A * | 6/1996 | Bernhardt et al. | 415/14 |
| 5,710,470 A | 1/1998 | Komata et al. | |
| 5,894,181 A | 4/1999 | Imlach | |
| 6,191,515 B1 | 2/2001 | Post | |
| 2006/0012258 A1 | 1/2006 | Sun et al. | |
| 2006/0040464 A1 | 2/2006 | Jung | |
| 2007/0040464 A2 | 2/2007 | Sun et al. | |

FOREIGN PATENT DOCUMENTS

| | | |
|---|---|---|
| CN | 1120256 A | 4/1996 |
| DE | 195 00 935 A1 | 7/1995 |
| EP | 0 266 991 | 5/1988 |
| GB | 1 163 632 | 9/1969 |
| GB | 2 335 242 | 9/1999 |

(Continued)

OTHER PUBLICATIONS

Summary of Office Action for Japanese Application No. 2004-520212, May 14, 2009.

(Continued)

*Primary Examiner* — Quyen Leung
*Assistant Examiner* — David W. Scheuermann
(74) *Attorney, Agent, or Firm* — Carlson, Gaskey & Olds PC

(57) ABSTRACT

The present invention provides a device and a method to enhance thrust load capacity in a rotor-bearing system. The load-enhancing device comprises a stator and a rotor arranged in such as way as to achieve a magnetic thrust load capacity enhancement by employing at least one permanent magnet, which produces an attracting force or an expulsing force between the rotor and the stator.

1 Claim, 1 Drawing Sheet

FOREIGN PATENT DOCUMENTS

| | | |
|---|---|---|
| JP | 62270824 | 11/1987 |
| JP | 63303216 | 12/1988 |
| JP | 4078315 | 3/1992 |
| JP | 4307108 | 10/1992 |
| JP | 7147707 | 6/1995 |
| JP | 8296645 | 11/1996 |
| WO | 98/31947 | 7/1998 |

OTHER PUBLICATIONS

English Translation PTO 08-6254 of JP 04078315, "Bearing Device" Jul. 2008.

* cited by examiner

DEVICE TO RELIEVE THRUST LOAD IN A ROTOR-BEARING SYSTEM USING PERMANENT MAGNETS

This application is a continuation of U.S. application Ser. No. 10/520,798, filed on Aug. 10, 2005, now U.S. Pat. No. 7,800,268 which is a national phase of PCT Application No. PCT/CA2003/000926, filed on Jun. 18, 2003, which claims priority to U.S. Provisional Application No. 60/394,528, filed on Jul. 10, 2002.

FIELD OF THE INVENTION

The present invention relates to rotor-bearing systems. More specifically, the present invention is concerned with a device and a method to enhance thrust load capacity in a rotor-bearing system.

BACKGROUND

In applications of high-speed rotor-bearing system with significant thrust load, i.e. where there exists a significant load parallel to the axis of rotation and tending to push the shaft in the axial direction, the design of thrust bearings that receive the longitudinal thrust or pressure of the shaft, especially in so-called oil-free bearings systems, is generally a challenging task.

Magnetic bearings, which may be dimensioned to withstand the worst possible operating conditions, as well as gas bearings, are often the favorite candidates for such high-speed oil free applications.

However, a number of design difficulties has to be solved in order to obtain a high load capacity in the thrust bearing of a magnetic bearing system involves, such as the following examples:
  a high load capacity means a large thrust area in the shaft, but the thrust area is limited by a maximum outer diameter ("OD") due to a rotor material strength limit;
  a high load capacity often requires large size coils and magnetic flux path in a stator, resulting in a large axial dimension of the stator, thus in turn requiring a longer rotor, but the rotor length is limited by shaft mode frequencies; and
  a high current is generally required in the coils, but it is limited by the temperature rise in the winding. Moreover, high current involves costly power electronics.

In gas bearing systems, such as hydrostatic or hydrodynamic systems, a high thrust load bearing requires a very large thrust area, which oftentimes results unrealistic to build. In such systems, the main problems are due to a low viscosity of the gas, a low relative speed between rotor and bearings near the center of rotation, and a limited pressure supply.

In rolling element thrust bearing systems and fluid bearing systems, a high load causes an increased system loss, consequently resulting in low efficiency, and even overheating of the systems.

From the foregoing, there is obviously a need for a compact and high efficiency device and method to enhance thrust load capacity in a rotor-bearing system.

OBJECTS OF THE INVENTION

An object of the present invention is therefore to provide an improved device and a method to enhance thrust load capacity in a rotor-bearing system.

SUMMARY OF THE INVENTION

More specifically, in accordance with the present invention, there is provided a thrust load enhancement device for a rotor-bearing system comprising:
  a stator mounted on a rotation axis of the rotor-bearing system;
  a rotor separated from the stator by a first air gap on the rotation axis; and
  at least one permanent magnet separated from the rotor by a second air gap,
  wherein the at least one permanent magnet, the stator and the rotor form a magnetic circuit characterized by a flux path so that a flux in the first and second air gaps generates a compensation force between the rotor and the stator that opposes an external force $F_{ext}$.

Other objects, advantages and features of the present invention will become more apparent upon reading of the following non-restrictive description of embodiments thereof, given by way of example only with reference to the accompanying drawings.

DESCRIPTION OF SPECIFIC EMBODIMENTS

Generally stated, the present invention provides a device and a method to enhance thrust load capacity in a rotor-bearing system.

More precisely, the load enhancement device according to a first aspect of the present invention comprises a stator and a rotor in such a way as to achieve a magnetic thrust load capacity enhancement by employing a number of permanent magnets, which produce an attracting force between the rotor and the stator that opposes a force applied from the outside and referred to hereinafter as $F_{ext}$. Such an outside force $F_{ext}$ can be caused by pressure or gravity in a vertical shaft configuration wherein the center of gravity of the configuration is low, for example.

Figure 1:
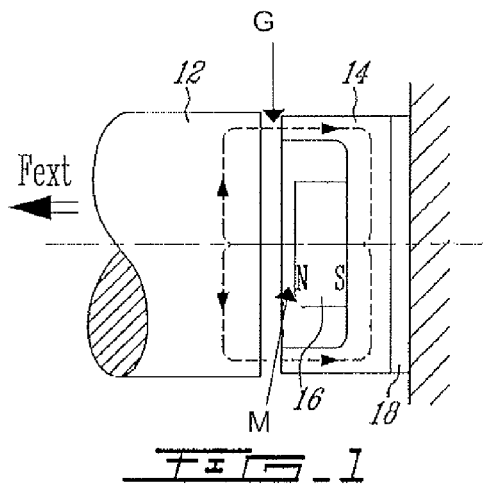
FIG. 1 is a cross-section of a load enhancement device according to a first embodiment of a first aspect of the present invention.
Figure 3:
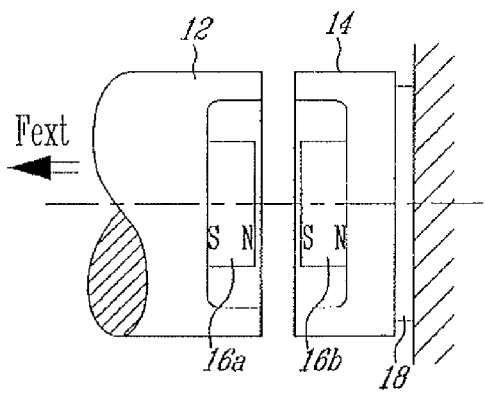
FIG. 3 is a cross-section of a load enhancement device according to a third embodiment of the first aspect of the present invention.

Turning now to FIGS. 1 and 3 of the appended drawings the load enhancement device according to various embodiments of the first aspect of the present invention will now be described.

The load enhancement device comprises a stator 14 and a rotor 12 arranged so as to obtain attracting compensation forces between the stator 14 and the rotor 12.

Turning to FIG. 1, as a first embodiment, the load enhancement device comprises the rotor 12, a stator pole piece 14, a permanent magnet 16, and a spacer 18.

The permanent magnet 16 is fixed to the stator pole piece 14 in such a way that the permanent magnet 16, the stator pole piece 14 and the rotor 12 form a magnetic circuit wherein the stator pole piece 14 and the rotor 12 are separated by a gap G, as well as the rotor 12 and the permanent magnet 16.

The resulting magnetic circuit is characterized by a flux path, shown in FIG. 1 as dash lines. The flux in the air gaps between the stator pole piece 14 and the rotor 12, and the rotor 12 and the permanent magnet 16 respectively, generates an attracting force that is able to compensate the external force $F_{ext}$.

By optimizing the geometry of the various soft magnetic pole faces, magnet and air gaps, a minimum volume of magnet can be used, under constrains of sizes and air gaps. When the disposition of the permanent magnet 16 in relation to the soft magnetic poles are thus fixed, the spacer 18 allows to adjust the air gaps in order to vary the compensation, since it is a well known physical rule that the magnetic force increases when the air gap decreases. The adjustment offers flexibility to handle modeling accuracy, manufacturing and material tolerances, and process variation.

Figure 2:
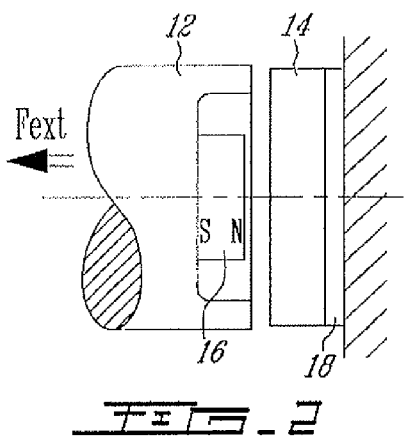
FIG. 2 is a cross-section of a load enhancement device according to a second embodiment of the first aspect of the present invention.

In a second embodiment shown in FIG. 2, the load enhancement device is basically similar to that shown in FIG. 1. The only difference is that the attracting force between the rotor 12 and the stator 14 is created by a magnet 16 mounted in the rotor 12.

The rotor 12 is made from a soft magnetic material such as carbon steel. The stator pole piece 14 is also made from a soft magnetic material such as mild steel, for example.

As shown in a third embodiment in FIG. 3, the attracting force between the rotor 12 and the stator 14 is created by a first magnet 16a mounted in the rotor 12, and a second magnet 16b mounted in the stator 14, each magnet 16a, 16b respectively having poles of different polarity facing each other. Alternatively, in cases where the rotor 12 and the stator 14 are made from soft magnetic materials, the attracting force between the rotor 12 and the stator 14 can be created by arranging pole faces between the rotor 12 and the stator 14.

According to a second aspect of the present invention, a load enhancement device is provided that comprises a stator and a rotor in such a way as to achieve a magnetic thrust load capacity enhancement by employing a number of permanent magnets to produce an expulsion force between the rotor and the stator.

Figure 4:
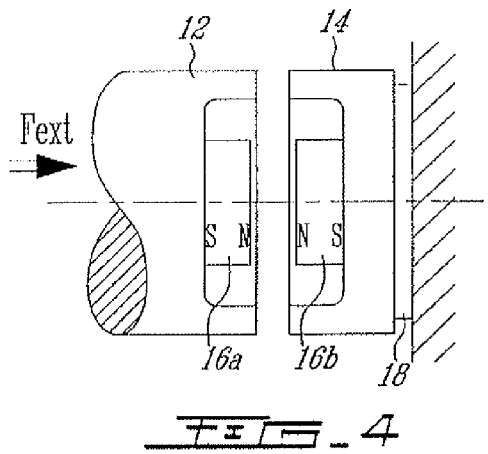
FIG. 4 is a cross-section of a load enhancement device according to a first embodiment of a second aspect of the present invention.

As shown in FIG. 4, an expulsion force can be created by a first magnet 16a mounted in the rotor 12, and a second magnet 16b mounted in the stator 14, the magnets 16a, 16b being arranged with poles of a similar polarity facing each other, for example with a pole N of the magnet 16a facing a pole N of the magnet 16b.

From the foregoing, it appears that either an attracting force or an expulsion force can be generated by using two magnets, by varying the arrangement of the polarities of the various magnets, depending on the direction of external forces to be dealt with.

In both cases when the load enhancement device of the present invention comprises a magnet fixed in the rotor and a magnet fixed in the stator (see FIG. 3 and FIG. 4), the rotor 12 and the stator 14 may be made of non-magnetic materials. If soft magnetic materials are used in rotor 12 and stator 14, the geometry of the magnets and the arrangement of the pole faces and air gaps may be optimized to use a minimum volume of magnets, thereby achieving compactness and cost savings. Indeed, if soft magnetic materials are used for the stator 14 and the rotor 12, the force generated in the air gap between them also contributes to the compensation force. Therefore, less magnet material is required. However, such an alternative may prove rather expensive, since soft magnetic materials may be quite expensive.

Again, the spacer 18 allows to vary the air gaps, and hence to adjust the compensation force.

Figure 5:
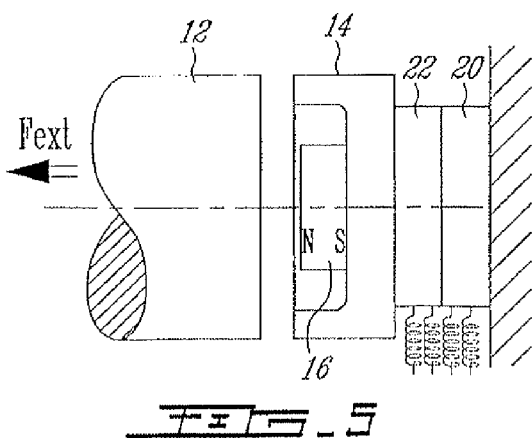
FIG. 5 is a cross-section of a load enhancement device according to a further embodiment of the present invention.

As can be seen in FIG. 5, if an automatic or in-situ adjustment of the compensation force is required, a piezoelectric actuator 20 may be used (instead of a spacer) to adjust the air gaps of the load enhancement device of the present invention, which in turns alters the compensation force.

People in the art will appreciate that the configuration of FIG. 5 may also be used to compensate an external dynamic force if a dynamic compensation signal is applied to the piezoelectric actuator 20.

Moreover, force measurement devices 22, such as strain gauges or piezoelectric elements, may be applied to the load enhancement device as shown in FIG. 5 to measure the compensation force. Such an option may prove useful in monitoring applications. For applications of active magnetic bearing systems, the force (dynamic and static) delivered by the active bearing is inherently available. Using a force measurement device as illustrated in FIG. 5, the force compensated by the load enhancement device of the present invention is therefore measured. As a result, the total external force applied to a shaft can be obtained.

According to a third aspect of the present invention, there is provided a method of obtaining different level of capacity enhancement by adjusting the magnetic air gap between the stator and rotor. Indeed, the load enhancement device described hereinabove allows generating a force between the stator and the rotor that compensates an external force $F_{ext}$.

Such an adjustment can be achieved by using a spacer (see FIG. 1), or automatically achieved by means of an actuator, for example a piezoelectric element, mounted in the stator as is shown in FIG. 5.

The force delivered by the load enhancement device and method of the present invention may be measured by either a strain-gauge or by a piezoelectric element (FIG. 5), for example.

As a way of example, the method according to an embodiment of the third aspect of the present invention comprises using soft magnetic materials to build the rotor and the stator, thereby optimizing usage of magnets generating a compensation force (see FIGS. 1 to 4 for example); using a spacer for adjustment of the compensation force; using a piezoelectric actuator to automatically adjust the compensation force (be it a static and/or dynamic force); using a strain gauge or a piezoelectric element to measure the compensation force; placing the load enhancement device at an end of a shaft, thereby not requiring modification of the shaft length.

As people in the art will understand from the foregoing, the configurations described hereinabove may be varied according to specific applications. For example, when it is important to minimize the shaft length, the configuration illustrated in FIG. 1 may be advantageous.

People in the art will appreciate that the method of the present invention allows a magnetic thrust load capacity enhancement, while avoiding the use of either solid of fluid contacts, in other words, by non-contact means.

Interesting applications of the present invention are in systems where the thrust load is unidirectional either from an external working load or a rotor weight in a vertical configuration.

People in the art will appreciate that the load enhancement device and method of the present invention may be used in a magnetic bearing system, a hydrostatic bearing system, a hydrodynamic bearing system, or a rolling element bearing system for example. As a specific example, the present invention may be applied to compensate a unidirectional external static load such as a working load, e.g. static pressure, or a shaft weight in a vertical configuration.

Therefore a compact, low cost thrust force handling (thrust bearing and thrust force enhancement device) may be achieved according to the teachings of the present invention.

Moreover, dynamic load compensation is also possible if the dynamic load is measured and an actuator is implemented as shown in FIG. 5.

Is should be noted that since the load enhancement device of the present invention may be positioned at one end of a shaft (see in FIGS. 1 to 5), the shaft length need not be modified to accommodate the load enhancement device.

People in the art will appreciate that the present invention does not introduce any friction loss due to a direct contact using rolling element thrust bearings for example, or fluid coupling such as fluid type thrust bearings. Moreover, since significantly larger gaps between the rotor and the stator may be used in comparison to the case of thrust bearings systems, the present invention allows minimizing windage losses.

Although the present invention has been described hereinabove by way of embodiments thereof, it may be modified, without departing from the nature and teachings thereof.

What is claimed is:

1. A method for thrust load enhancement for a rotor-bearing system comprising the steps of:

providing a rotor separated on the rotation axis from a stator by a first air gap;

providing at least one permanent magnet separated from one of the rotor and the stator by a second air gap;

forming a magnetic circuit with the at least one permanent magnet, the stator and the rotor characterized by a flux path so that a flux in the first and second air gaps generates a compensation force between the rotor and the stator that opposes an external force $F_{ext}$;

measuring the compensation force; and changing a relative position of the at least one permanent magnet in response to the measured compensation force to alter the compensation force.

* * * * *